United States Patent
Johansson et al.

(10) Patent No.: US 6,700,223 B1
(45) Date of Patent: Mar. 2, 2004

(54) ACTIVE BOOSTER TRANSFORMER SYSTEM

(75) Inventors: Bengt Johansson, Gothenburg (SE); Yngve Hamnerius, Gothenburg (SE)

(73) Assignee: EnviroMentor AB, Gothenburg (SE)

( * ) Notice: Subject to any disclaimer, the term of this patent is extended or adjusted under 35 U.S.C. 154(b) by 0 days.

(21) Appl. No.: 09/979,553

(22) PCT Filed: May 25, 2000

(86) PCT No.: PCT/SE00/01063
§ 371 (c)(1),
(2), (4) Date: Nov. 26, 2001

(87) PCT Pub. No.: WO00/72338
PCT Pub. Date: Nov. 30, 2000

(30) Foreign Application Priority Data

May 25, 1999 (SE) ............................................. 9901918

(51) Int. Cl.⁷ ................................................. H04B 3/28
(52) U.S. Cl. ........................................... 307/91; 307/89
(58) Field of Search ..................................... 307/89–91

(56) References Cited

U.S. PATENT DOCUMENTS

| | | | | |
|---|---|---|---|---|
| 4,218,732 A | * | 8/1980 | Lafuze ......................... | 363/160 |
| 5,309,086 A | * | 5/1994 | Johansson et al. ......... | 324/117 R |
| 5,321,318 A | * | 6/1994 | Montreuil ................... | 307/326 |
| 5,534,756 A | * | 7/1996 | Beeteson et al. ........... | 315/370 |
| 5,536,978 A | * | 7/1996 | Cooper et al. .............. | 307/89 |
| 5,726,504 A | * | 3/1998 | Pecukonis et al. ......... | 307/105 |
| 5,825,170 A | | 10/1998 | Montreuil | |
| 5,914,842 A | * | 6/1999 | Sievers ........................ | 361/42 |
| 5,952,734 A | * | 9/1999 | Gelbien ....................... | 307/91 |

OTHER PUBLICATIONS

"Sug bort magnetfalten!", *ERA 10:1995*, vol. 68, 1995, Stockholm, p. 38 and p. 40.

\* cited by examiner

*Primary Examiner*—Gregory J. Toatley, Jr.
*Assistant Examiner*—Sharon A. Polk
(74) *Attorney, Agent, or Firm*—Young & Thompson

(57) ABSTRACT

An active booster transformer system with a booster transformer core (S, 10, 17) of the type which is applied around an electrical cable (K, 1, 13) for reducing stray currents and in which the booster transformer core is a body built up of a magnetizable material provided with a continuous channel intended to accommodate the cable. The system includes a current sensor (G, 2–3, 14–15) which senses the net current in the cable (K, 1, 13), an amplifier unit (F, 4–7), the input signal of which is controlled by the current ($I_v$) sensed by the current sensor, and a magnetizing winding (L, 3, 15) situated on the booster transformer core (S, 10, 17). The output of the amplifier unit is arranged to drive the magnetizing winding and to create a magnetic flow in the booster transformer core, the flow, in turn, inducing a longitudinal voltage in the cable which counteracts the stray current.

14 Claims, 4 Drawing Sheets

ACTIVE BOOSTER TRANSFORMER
SYSTEM

TECHNICAL FIELD

The present invention relates to an active booster transformer system comprising a -booster transformer core of the type which is applied around an electrical cable for reducing stray currents, the booster transformer core being a body built up of magnetizable material provided with a continuous channel intended to accommodate the cable.

PRIOR ART

Electric currents generate magnetic fields. In the case of a normal lamp cable with two conductors, one for the current to the lamp and one for the return current, however, the currents in the cable create almost no net field but almost completely cancel out each other's effect since the conductors are running in parallel adjacent to one another and the currents in the conductors are the same but oppositely directed. If, however, the conductors are separated from one another for some reason, a magnetic field is obtained around each conductor, as in a power line, and if the fitting of the lamp is also earthed via its holder, leakage to earth can arise and the currents are then no longer the same in the conductors, i.e. a net magnetic field is created along the cable even if the conductors are running adjacent to one another. A current which does not follow the intended conductor but takes off on unintended paths, for example via the protective earth, is called a stray current. Due to their electrical equipment and couplings, many houses have existing magnetic fields which interfere with electronic equipment and which can exceed the recommended limit values. The source of the magnetic fields are in most cases stray currents. Stray currents are often due to the fact that, certainly in Sweden, there is an electric system with four conductors in the main line to the building.

FIG. 1 shows a four-conductor system of the known type with a cable K. A current I, which arises in a phase R, if a single-phase load L is connected, has two paths from the transforming station C to earth of the feeding transformer T. The return current can either go via the neutral conductor N with part-current $I_n$ as intended or via the protective earth and a water pipe V with part-current $I_v$ to earth point of the transformer. When there is current in the water pipe V, this generates a magnetic field around it but also around the cable and return current is jacking so that the magnetic fields from the conductors of the cable no longer neutralize each other. The net current in the cable is as large as $I_v$. It is often possible to measure up to ten amperes in water, gas and heating pipes in a house which has such installations. When these stray currents continue in lines under the ground outside the building, further magnetic fields are also obtained from these lines.

It is also usual that there are stray currents in existing data networks which, apart from generating magnetic field levels which are potentially harmful to people, can cause serious communication problems. The image on screens is distorted so that it is impossible to work with screens in rooms with magnetic field peaks of over 0.5–1 $\mu T$.

The best way to avoid magnetic fields from stray currents is to install a five-conductor system from the beginning. In contrast to the four-conductor system, the protective earth conductor is here separated from the neutral conductor which is why the return current has to take the correct path via the neutral conductor of the electric system back to the transformer. Installation of a five-conductor system leads to low magnetic fields in the house and a low risk of problems with data communication. In hospitals it has long been obligatory to have a five-conductor system. In a new construction, it also involves very little extra cost compared with an installation in an existing house where it can be considerably more costly to change to a five-conductor system since it is not only the electric installations of the house which are affected but also the cable to the substation of the electric power station which must be changed to five conductors.

In smaller buildings like private houses, the stray currents can often be minimized, i.e. stopped by breaking up the alternative current path, e.g. by exchanging a short section of a metallic water, gas or heating pipe for a plastic pipe. This is not a practicable method in larger buildings.

A cost-effective alternative to changing to a five-conductor system is to install at a suitable location, one (or more) booster transformer which is shown diagrammatically in FIG. 2. In principle, FIG. 2 is the same as FIG. 1 with the same designations but with the addition that a booster transformer S applied around a cable K is arranged which is for example but not necessarily of the type which is described in Swedish patent application No. 9900501-9, the complete content of which is herewith incorporated in the present application. The principle of the booster transformer has long been used in electric railways in order to avoid currents from leaking out into the surrounding soil and pipeline systems. The main part of the phase imbalance current I is caused by electromagnetic induction to go through the neutral conductor whereby the stray current $I_v$ is reduced.

A booster transformer of this type can be said to form a single-turn transformer with the four conductors of the cable as windings. The operation of the booster transformer S can be described as the net current (=$I_v$) in the cable K causing a magnetic flow to be created in the booster transformer S. The flow, in turn, induces a voltage in all conductors of the cable K. The induced voltage counteracts the potential difference between both ends of the conductor PE+N which is caused by its operating current and resistance. This reduces the potential difference which is biasing the stray currents. The efficiency largely depends on the physical dimensions and capability of the material in the core of the booster transformer to conduct magnetic flows.

One of the disadvantages of the technique described above is that it requires a not negligible remaining stray current $I_v$ for forming an effective magnetic flow in the booster transformer. For this reason, it is not possible with this technique to completely eliminate the stray currents but only to reduce them. However, in certain situations it is desirable with a very small remaining stray current. It is of course possible to select a booster transformer with large dimensions but it often becomes unrealistically large and also costly and generally cumbersome.

DESCRIPTION OF THE INVENTON

The above problems have been solved by the booster transformer being included in a system which comprises a current sensor which senses the net current in the cable, an amplifier, the input of which is controlled by the current sensed by the sensor, and a winding located on the booster transformer, the amplifier being arranged to feed the winding on the booster transformer with a current which creates a magnetic flow in the booster transformer, which flow, in turn, induces a longitudinal voltage in the cable which counteracts the stray current. The longitudinal voltage (common-mode voltage) counteracts the stray current without the stray current itself needing to be large enough for creating the necessary magnetic flow. As a result, a booster transformer can be made "virtually" many times larger and the stray current outside the cable can be reduced very effectively without the transformer being unwieldy large.

In a special embodiment of the system, the current in the winding is generated by it being connected to the output of an amplifier, the output voltage or output current of which is controlled in such a manner that it is an image of the remaining stray current. In the first case, a net voltage is transformed to the cable which counteracts the voltage which drives the stray current. This is done by an amplifier with low output impedance, i.e. the output voltage is largely independent of the output current. In the second case, the booster transformer is fed with an amplified image of the stray current, with the result that a lower remaining stray current is required for obtaining a sufficiently large magnetic flow in the booster transformer for the stray current to be counteracted. This presupposes that the amplifier has a high output impedance, i.e. the output current is largely independent of the output voltage. An amplifier with moderate output impedance can also be used and the operation of the system is then a combination of the two above.

The current image is obtained by means of a sensor for the stray current. In the first variant of the system, a current sensor, for example of the current clamp type is mounted on the same cable as the booster transformer connected to the amplifier. It is also possible to measure the current on the booster transformer itself which means that there is no need to mount a sensor on the cable, but such a system requires more complicated electronics than the usual sensor. The booster transformer, the electric system, the current sensor and the amplifier together constitute a feedback system which is controlled for the lowest possible stray current.

DESCRIPTION OF THE FIGURES

The invention will be described below and explained by means of some examples in association with attached drawings, in which FIG. 1, already described, diagrammatically shows a normal 4-conductor system, FIG. 2 diagrammatically shows the 4-conductor system shown in FIG. 1 with a booster transformer, FIG. 3 diagrammatically shows a cable with a booster transformer system according to the invention.

PREFERRED EMBODIMENTS

Figure 1:
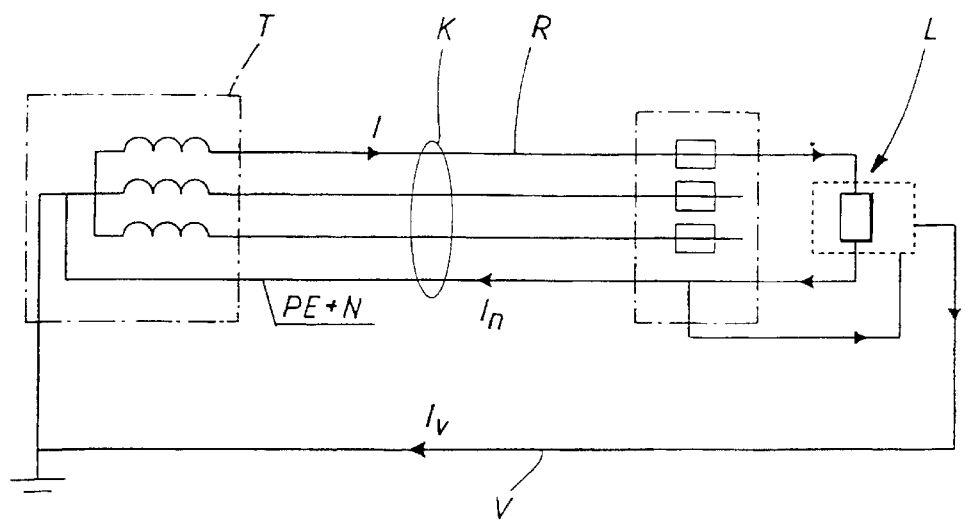
Figure 2:
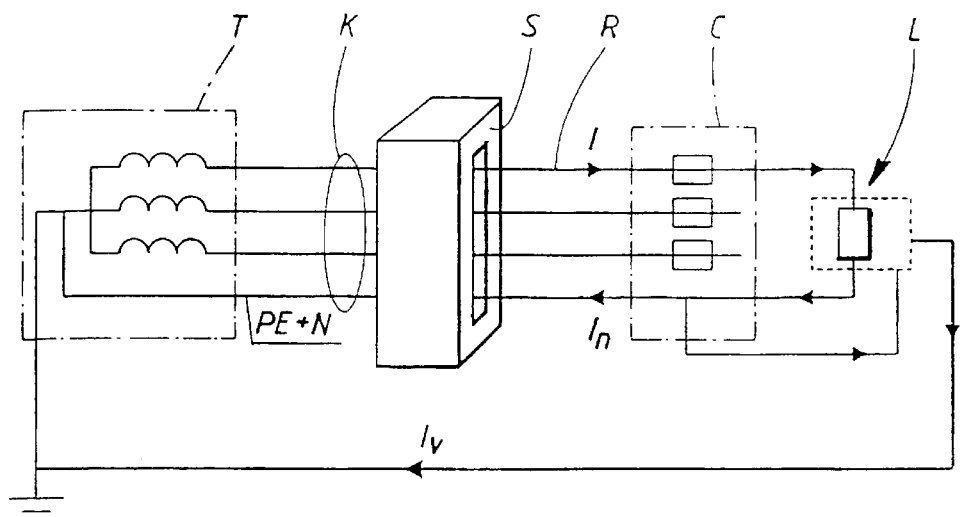
Figure 3:
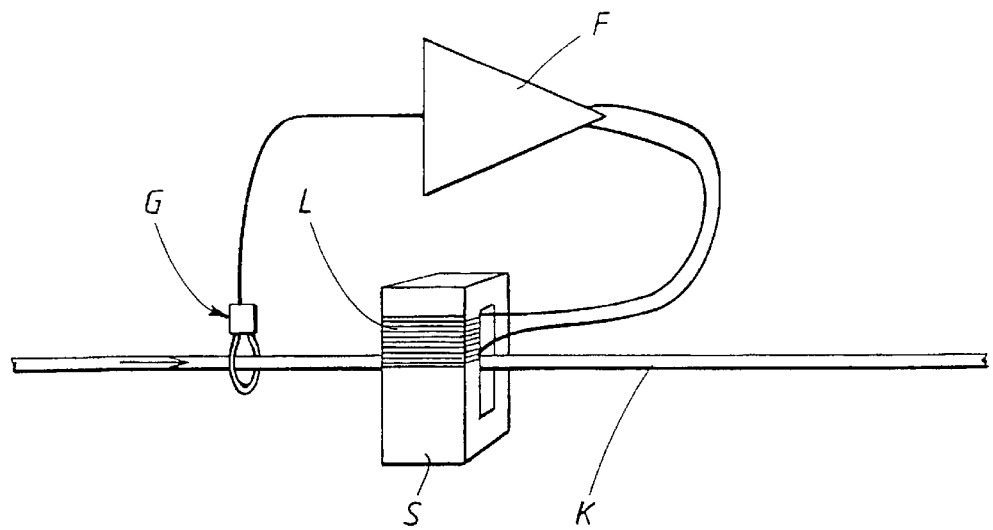

The invention is shown in principle in FIG. 3. As shown in this figure, the invention includes a booster transformer core S which can be of the type described in Swedish patent application 9900501-9 and which can be opened. The booster transformer core S is arranged with its continuous channel around a cable K which can be a cable with one or more conductors. Although the one in the figure is marked as a single cable K it can also be a bunch of cables each one with several conductors, which cables run along one another over a distance which is to be taken care of. Over the same cable K or its equivalent, a current sensor G is also arranged which can be a conventional current sensor of the clamp type which senses a magnetic field. The output signal from the current sensor G constitutes the input signal for an amplifier unit F. With suitable amplification and phase, the output of the amplifier unit F drives a current through a winding L on the booster transformer core S. As a result, the net current, the equivalent of the stray current, which is sensed by the current sensor, can be used for creating, after amplification, a magnetic field in the booster transformer which, in turn, creates such a voltage across the conductors in the cable K which counteracts and largely eliminates the stray current.

In connection with FIG. 4, a continuing simplified coupling will now be described which, however, is more detailed with respect to, among other things, the amplifier unit. For the sake of simplicity, details have been left out in the description which are self-explanatory to an expert in the field such as, for example, function indication and power supply of the different electronic parts. For the sake of clarity, the input and output of the amplifier unit are symbolically marked by pole terminals P, like the input in FIG. 5.

An amplifier 7 feeds a magnetizing winding 9 on a booster transformer core 10 with an amplified image of the stray current $I_v$ in a cable 1 which extends through the hollow space of the booster transformer. The image of the stray current is obtained in the following way. On the cable 1, a sensor core 2 is located with the cable running through it, which core 2 is constructed of oriented transformer laminations. In this particular case, the core 2 has been selected with a cross-sectional area of approx. 1 cm$^2$ and is provided with a sensor winding 3 consisting of approx. 100 turns of thinly enamelled copper wire. In the winding 3, a voltage is induced by the net current ($=I_v$) which flows in the cable 1, which voltage is proportional to the time derivative of the net current. The voltage from the sensor winding 3 is conducted to and amplified in an input amplifier 4 with variable amplification. The output signal from the input amplifier 4 is conducted to and converted in an integrator stage 5 into an image of the net current. At the same time, the integrator stage 5 functions as a first-order high-pass filter for the current signal. The cut-off frequency is selected to be approx. 30 Hz. The output signal from the integrator stage 5 is filtered through a first-order low-pass filter with a cut-off frequency of 150 Hz. This includes the third harmonic. The filter function of the integrator, which, for example, in a normally used integrator coupling based on an operational amplifier can originate from a resistance which is coupled in parallel with the integrating capacitor, together with the filter function of the low-pass filter in the figure, has been symbolized by a filter stage 6 as a bandpass filter for the signals between the output of the integrator stage 5 and an input of an output amplifier 7. Since the bandpass filter greatly lowers the gain at low and high frequencies and only provides a phase displacement of 90°, this coupling has the result that the total open-loop gain can be greater than 10 times before the phase margin becomes so small that the system becomes unstable.

Suitable circuits for making up the output amplifier 7 are high-power operational amplifiers for audio use. Due to large-scale production, these are inexpensive and have high reliability. The output of the output amplifier 7 is connected to one end of the magnetizing winding 9 on the booster transformer core. The other end of the winding 9 is coupled to earth via a resistor 8 of approx. 1 Ω. The inverting (−)

input of the output amplifier (operational amplifier) is also earthed via the resistor 8 and the output current from the output amplifier 7 is therefore controlled in such a manner that it is proportional to the signal from the filter stage to the noninverting input (+) of the operational amplifier. This provides a high output impedance to the load of the amplifier, winding 9. The output current can be limited to just 1 A by limiting the top of the signal from the filter stage to the input of the output amplifier 7 by means of two parallel mutually oppositely connected silicon diodes which are located between the noninverting input of the output amplifier and earth (not shown). The magnetizing winding 9 consists of 24 turns of insulated coupling wire wound on the booster transformer core 10. The system is adjusted by increasing the gain of the input amplifier 4 as much as possible without the system becoming unstable and self-oscillating. The higher the gain the lower the remaining stray current. The signal polarity through the amplifier unit and in the system must certainly be selected such that the feedback system does not become self-amplifying and, instead, increases the stray current.

Figure 5:
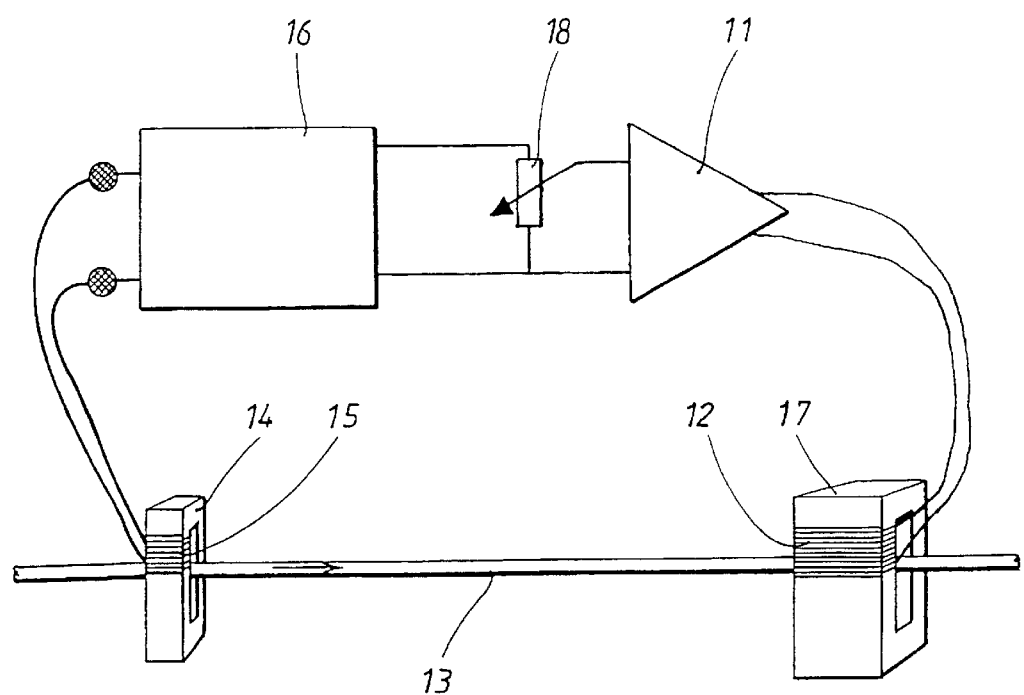
FIG. 5 shows a further variant of an arrangement with an active filter.

FIG. 5 shows a block diagram of a variant of the amplifier arrangement forming part of the invention. Here, too, circuits for function indication, power supply and operating delay and fuses, e.g. at the output of the output amplifier, have been left out in the figure because these details are not part of the invention as such and, moreover, can be easily supplemented by an expert in the field.

An output amplifier 11, which has a low output impedance, feeds a magnetizing winding 12 on a booster transformer core 17 with a voltage which is an amplified image of the equivalent of the stray current $I_v$ in a cable 13. On the cable 13, a sensor is located around it with a sensor core 14 constructed of oriented transformer laminations. The sensor core 14 has a cross-sectional area of approx. 1 cm². The sensor core is provided with a sensor winding 15 consisting of approx. 100 turns of thinly enamelled copper wire. In the winding 15, a voltage is induced which is proportional to the time derivative of the net current (=$I_v$) which flows in the cable 13. The voltage from the winding 15 is amplified in an active analogue filter 16 which will be described in greater detail below.

A potentiometer 18 is used for adjusting the input voltage to the output amplifier 11 which mainly consists of a commercial audio output stage for PA use. The output power is specified as 180 W in 8 ohms. The output of the output amplifier is connected to the magnetizing winding 12 which consists of 10–20 turns of insulated coupling wire which is wound around the power transformer core 17 mounted around the cable 13. The whole system is adjusted by the potentiometer 18 being turned up as much as possible without the system becoming unstable and self-oscillating. The higher the gain the lower the stray current. The signal polarity through the amplifier unit and in the system must of course be selected such that the feedback system does not become self-amplifying and, instead, increases the stray current.

Figure 6:
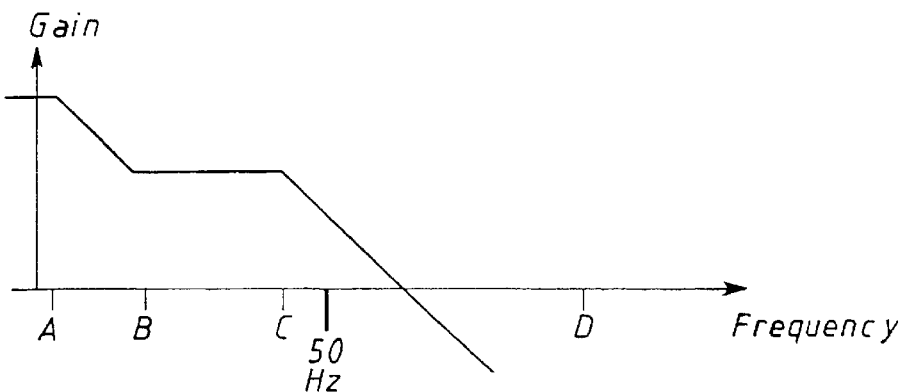
FIG. 6 shows the frequency response of the active filter in FIG. 5.

The operation of the analogue filter 16 in FIG. 5 will now be explained in connection with FIGS. 6 and 7. FIG. 6 shows asymptotically the frequency response of the active filter 16 in the low-frequency range. Cut-off frequencies A-D can be seen in the figure where A<B<C<50 Hz<D. The filter mainly functions as an integrator for frequencies over C for adapting the signal from the sensor winding 15 so that it corresponds to the stray current. Below the cut-off frequency C, the filter has a flat frequency response which, together with the derivative function of winding 15, provides for the arrangement, taken together, becoming a high-pass filter with cut-off frequency C which is approx. 30 Hz. Between frequencies A and B, however, the filter is integrating for counteracting a high-pass filtering with cut-off frequency B in the output amplifier. The filter also has an input resistance which is adapted to constitute, together with the resistance and inductance of the sensor winding 15 on the sensor core 14, a first-order low-pass filter with cut-off frequency D.

Figure 7:
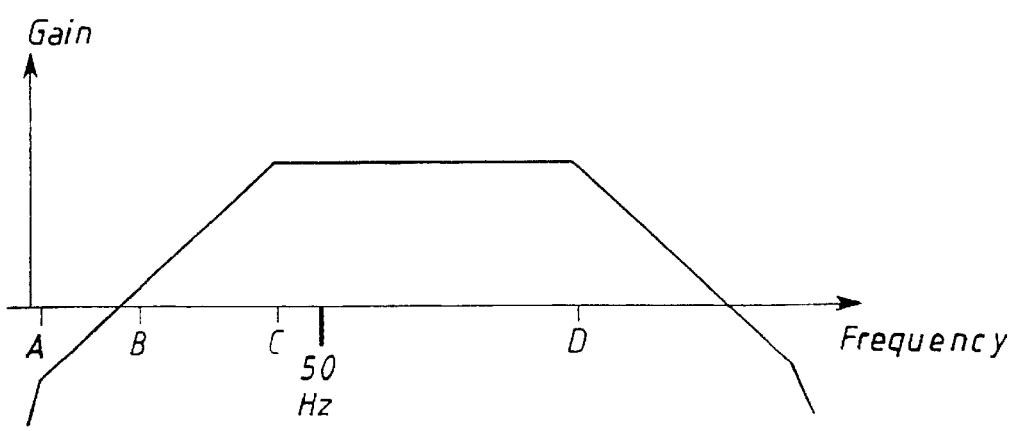
FIG. 7 shows the frequency response of the entire amplifier unit according to FIG. 5.

Together with the output amplifier 11, the whole arrangement has a frequency response according to FIG. 7. The frequency response is adapted for providing a maximum gain (which provides a maximum reduction of the stray current) with a net frequency of 50 Hz and its nearest harmonics up to around 1 kHz. Frequency A is approximately 1 Hz and frequency B a few Hz. If frequency D is about 2–3 kHz, the most important harmonics are included. Outside this range, the gain decreases at 20 dB per decade (6 dB per octave) which is important for the gain to be sufficiently low so that the phase displacement does not become so great that the arrangement becomes unstable. The circuit details of the active filter have been left out here since the details given above are sufficient for an expert in the field to be able to construct a filter with the specified characteristics.

The sensor which is used in the system for sensing the net current can be selected among a plurality of known sensors. Certainly, the signal processing in the amplifier unit must be selected accordingly; i.e., for example, if a sensor which is not derivative but directly images the stray current is used, the current is not to be integrated. However, a sensor can be mentioned which advantageously can be used in this connection, namely the magnetic current comparator which operates by the so-called zero flux method. A Hall element can also be used. Also, by measuring the magnetic flow in the booster transformer core itself, a signal can be indirectly obtained which corresponds to the net current sought.

The invention described above in connection with the figures is not limited to the examples shown but can be varied by the expert in many ways within the scope of the claims following. For example, the system is not limited to only booster transformers mounted on cables but the invention can be used in all situations where it is desired to effectively reduce stray currents. Thus, it can be used together with booster transformers on cable stages, pipelines and other conductive devices where it is desired to have an effective reduction of stray currents or on whole collections of cables which have an extent where they run in parallel and from which it is intended to remove magnetic fields. It is also possible to use a sensor for several cables which have their own booster transformer and by this means to control these in parallel with the aid of the sensor signal. This also makes it possible to obtain a certain reduction of the current in each respective cable if the windings of the booster transformer are allowed to operate passively with different currents between the cables, e.g. by connecting the windings in series.

Figure 4:
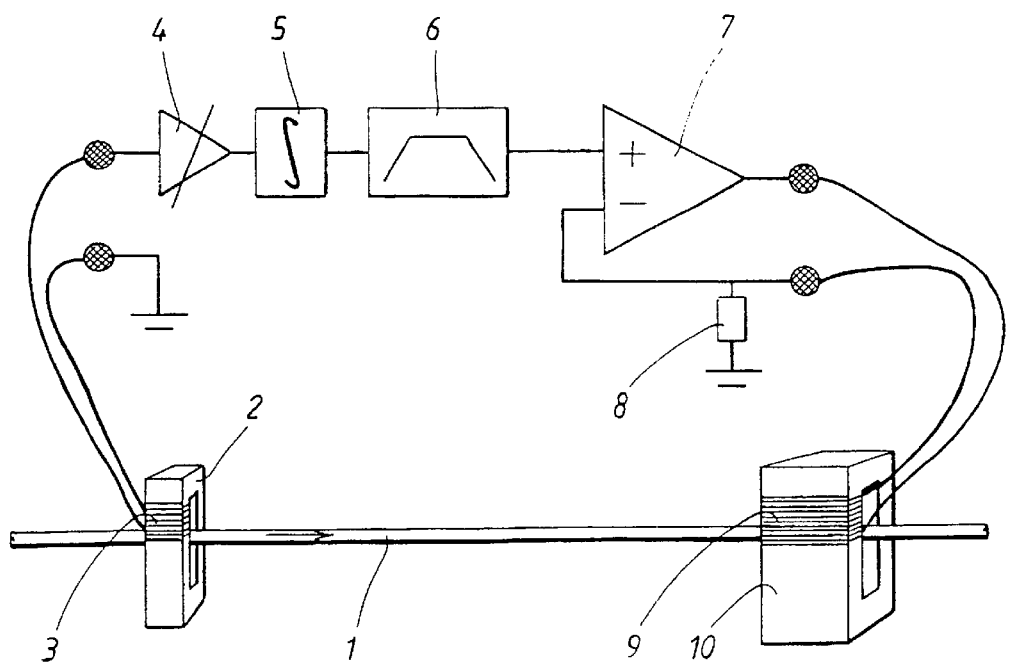
FIG. 4 shows a simplified diagram of a somewhat more sophisticated variant of the invention.

It is certainly also possible to have, instead of a filter function built into the integrating circuit 5 in FIG. 4, a separate high-pass filter circuit with cut-off frequencies selected in the same manner so that, together with the filter stage 6, they form the desired bandpass filter.

Control of the gain in the amplifier units can certainly be carried out in other ways, known by the expert, in the respective amplifier couplings shown.

What is claimed is:

1. Active booster transformer system comprising:

a booster transformer core (S, 10, 17) of the type which is applied around an electric cable (K, 1, 13) for reducing stray currents, the booster transformer core being a body built up of magnetizable material provided with a continuous channel, intended to accommodate the cable, a current sensor (G, 2–3, 14–15) which senses the net current in the cable (K, 1, 13), and an amplifier unit (F, 4–7), the input signal of which amplifier unit comes from the current sensor and a magnetizing winding (L, 3, 15) situated on the booster transformer core (S, 10, 17), the output of the amplifier unit being arranged to drive the magnetizing winding to create a magnetic flow in the booster transformer core, the flow, in turn, inducing a longitudinal voltage in the cable which counteracts the stray current, wherein, the amplifier unit (F, 4–7) is built up in such a manner that its output coupled to the magnetizing winding (L, 3, 15) exhibits an output voltage which is an image of the remaining stray current sensed by the current sensor.

2. Active booster transformer system according to claim 1, wherein, the amplifier unit has a low output impedance.

3. Active booster transformer system according to claim 1, characterized in that the sensor is arranged on the same cable as the booster transformer.

4. Active booster transformer system according to claim 1, wherein, the current sensor provides an output signal which is proportional to the derivative of the current, and the amplifier unit comprises an adjustable amplifier stage (4), an integrator stage (5), a bandpass filter stage (6) and a output amplifier (7).

5. Active booster transformer system according to claim 1, characterized in that an active bandpass filter (16) is included in the amplifier unit.

6. Use of a booster transformer system according to claim 1, characterized in that the core of the booster transformer is attached on one or more cables.

7. Use of a booster transformer system according to claim 1, characterized in that the current path which conducts a stray current is one of a water pipe, a cable stage, and an electrically conducting feature.

8. Active booster transformer system comprising:

a booster transformer core (S, 10, 17) of the type which is applied around an electric cable (K, 1, 13) for reducing stray currents, the booster transformer core being a body built up of magnetizable material provided with a continuous channel, intended to accommodate the cable;

a current sensor (G, 2–3, 14–15) which senses the net current in the cable (K, 1, 13); and an amplifier unit (F, 4–7), the input signal of which amplifier unit comes from the current sensor and a magnetizing winding (L, 3, 15) situated on the booster transformer core (S, 10, 17), the output of the amplifier unit being arranged to drive the magnetizing winding to create a magnetic flow in the booster transformer core, the flow, in turn, inducing a longitudinal voltage in the cable which counteracts the stray current, wherein, the amplifier unit is built up in such a manner that its output coupled to the magnetizing winding (L, 3, 15) exhibits an output current which is an image of the stray current sensed via the sensor (G, 2–3, 14–15).

9. The system of claim 8, wherein the amplifier unit has a high output impedance.

10. Active booster transformer system according to claim 8, characterized in that the sensor is arranged on the same cable as the booster transformer.

11. Active booster transformer system according to claimed 8, wherein, the current sensor provides an output signal which is proportional to the derivative of the current, and the amplifier unit comprises an adjustable amplifier stage (4), an integrator stage (5), a bandpass filter stage (6) and a output amplifier (7).

12. Active booster transformer system according to claim 8, characterized in that an active bandpass filter (16) is included in the amplifier unit.

13. Use of a booster transformer system according to claim 8, characterized in that the core of the booster transformer is attached on one or more cables.

14. Use of a booster transformer system according to claim 8, characterized in that the current path which conducts a stray current is one of a water pipe, a cable stage, and an electrically conducting feature.

* * * * *